United States Patent Office 3,421,462
Patented Jan. 14, 1969

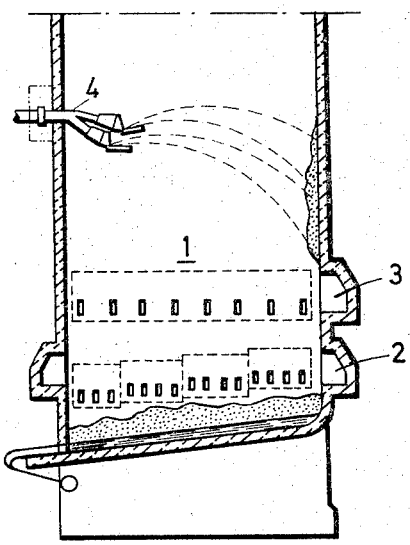
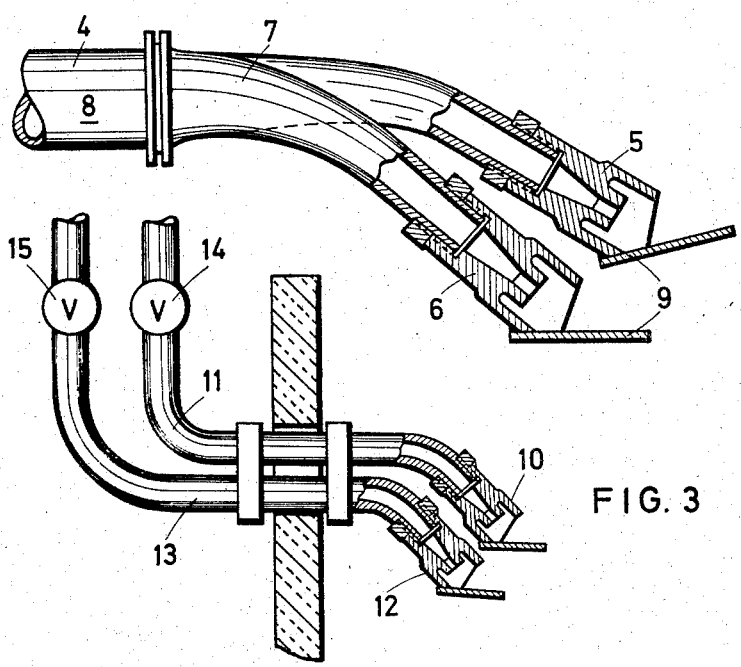
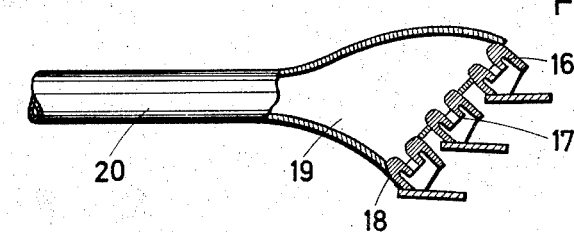
FIG. 1
FIG. 2
FIG. 3
FIG. 4

3,421,462
COMBUSTION FURNACES FOR WASTE LIQUOR
Jacob Erland Magnus Wessberg, Torslanda, Sweden, assignor to Aktiebolaget Gotaverken, Goteborg, Sweden, a corporation of Sweden
Filed Apr. 28, 1967, Ser. No. 634,679
Claims priority, application Sweden, Apr. 29, 1966, 5,844/66
U.S. Cl. 110—7      2 Claims
Int. Cl. F23g 7/00; F23d 7/00; F23d 11/00

ABSTRACT OF THE DISCLOSURE

In a combination furnace for dehydrating and thereupon burning waste pulping liquor, improved atomization is effected through use of two or more injection nozzles disposed one above the other, each nozzle having a spraying plate and being individually supplied with waste liquor in adjustable volume.

---

In combustion furnaces for waste liquors, for instance black liquor from the cellulose pulp manufacture, the liquor is sprayed into the furnace in the shape of a flat jet. The liquor is there subjected to the influence of combustion gases and dehydrated. The dried residue falls to the bottom of the furnace where it is burned. The content of dry substance in the waste liquor usually is 50 to 60%, the remainder being water, and there are considerable quantities which must be processed. The heat value of the liquor is, in most instances, sufficient to maintain the dehydrations and combustion. The chemical components in the liquor are melted and withdrawn in fluid form through a spout at the bottom of the furnace and are regenerated and again used in the pulping process.

It is an obvious desire to eliminate to the largest possible extent the loss of chemicals together with the combustion gases. The injection nozzles mostly utilized heretofore have been provided with a flat spraying plate arranged in a general horizontal plane, which plate deflects the jet and forms it into a flat layer which—when it leaves the edge of the spraying plate—is subdivided into a large number of droplets. In order to give these droplets a size suitable for dehydration and combustion, the layer must have a certain thickness when it reaches the discharge edge of the spraying plate. Consequently, the plate must have a considerable surface, and as the liquor is ropey a high pressure is necessary to bring about the desired distribution of the liquor over the large surface of the plate. The high pressure, however, brings about a disturbance to the flow, i.e. where the jet meets the plate.

One manner of lessening the size of the individual plates—whilst simultaneously maintaining the length of the edge and also the thickness of the layer—is to arrange two or more injection nozzles one above the other, each nozzle in the manner known per se being provided with an essentially horizontal spraying plate, the supply pipe for said nozzles being designed to divide the main stream of liquor delivered to the nozzles in proportions suited to the desired spraying properties.

The invention will now be described in greater particularity and with reference to the appended drawing, in which FIG. 1 shows a section through the lower part of a furnace provided with an injection member with twin nozzles;

FIG. 2 shows the injection member on a somewhat larger scale;

FIG. 3 shows a modified embodiment, where the nozzles of the injection member are connected to different sources of supply; and FIG. 4 shows a further modification of an injection member provided with three nozzles.

The furnace 1 is in the usual manner provided with a row of openings 2 for primary air and another row of openings 3 for secondary air. Waste liquor is sprayed through an injection member 4 arranged at one side wall of the furnace. This member is—as best shown in FIG. 2—provided with twin nozzles 5 and 6, respectively, which are connected by means of a branch pipe 7 to a common supply conduit 8. Each nozzle will thus—in this embodiment—spray about one-half of the supplied total quantity of liquor. The thickness of the layer which is formed on each spraying plate 9 will in this manner be as thick as it should have been if the total quantity had been sprayed over a single, considerably larger plate. The supply pressure may, however, be lower and this circumstance makes possible a smoother flow over the plate and a better uniformity of the droplets.

The jet will, during its movement away from the nozzle, obtain a certain "thickness." By arranging two nozzles, one above the other, it is possible to distribute the droplets in a better manner in the vertical direction so that a bigger area of the walls of the furnace will be sprayed, without the necessity of making as large movements with the nozzle as has hitherto been required. In order to improve this section one or both plates 9, 9 may be so disposed that their position deviates somewhat from the horizontal plane, as is illustrated in FIG. 2, wherein each of plates 9, 9 is upwardly tilted from front to back, and the upper plate is tilted at a larger angle from the horizontal than is the lower plate.

Instead of connecting two nozzles to a common supply conduit it is possible—especially if it is desired to burn liquors of different types simultaneously—to utilize two pipes each of which ends in a spraying nozzle but which are interconnected to form a single injection member. One such embodiment is shown in FIG. 3. The individual nozzles are similar to those of FIG. 2, but nozzle 10 is connected to one supply conduit 11 and nozzle 12 is connected to a separate supply conduit 13. A valve, 14 and 15 respectively, is arranged in each conduit which is connected to a separate supply source for waste liquors. In many manufacturing processes waste liquors of different composition are produced—for instance, in a cellulose pulp mill both sulphate and sulphite liquor. One of these liquors usually contains a larger content of volatile components than the other, and it is then advantageous to supply the high volatile content liquor to the lower nozzle. The jet from the nozzle above it will then catch and deflect particles and gasified components from the dehydration of the high volatile liquor, which otherwise would have passed along with the combustion gases.

This effect is further enlarged if three or more nozzles are arranged in the previously described manner. One embodiment, wherein nozzles 16, 17 and 18 are connected to a distribution box 19 and from thence to a common supply conduit 20, is shown in FIG. 4. Each jet will collect some of the content from the jet below. Instead of spraying the liquor in a single broad jet as hitherto usual, one obtains a narrow jet of considerable "height," where, however, the thickness of the individual layers on the spraying plates is ideal for the spraying operation.

Injection members can of course be arranged at several sides of the furnace, for instance at two opposite walls, and they may in a manner well known in the art be operated to swing in the horizontal and/or in the vertical direction.

I claim:

1. In a combustion furnace for cellulose waste liquor having generally vertical side walls and a bottom, said furnace having means to spray such waste liquor a distance above the bottom of the furnace in a manner to dehydrate the liquor due to the action of combustion gases emanating from the combustion of dried waste liquor residue collected on the bottom of the furnace and moving in a generally vertical path in the furnace, the improvement of an injection member extending through a side wall of the furnace and toward an opposite side wall, said member comprising at least two nozzles each nozzle being provided with an essentially horizontal spraying plate for projecting a substantially flat layer of waste liquor across said path, and a supply pipe for said nozzles which delivers waste liquor to the nozzles in proportions suited to the desired spraying properties, said nozzles being arranged one above the other and in such relationship that a flat layer of liquor discharged from the uppermost of said nozzles and spraying plates contacts solid particles and gasified components from the dehydration of a layer of waste liquor discharged from a lower of said nozzles and sparying plates.

2. The invention defined in claim 1, wherein each of the plurality of nozzles is connected by supply pipe to a separate source of waste liquor.

References Cited

UNITED STATES PATENTS

| | | | |
|---|---|---|---|
| 418,273 | 12/1889 | Cloudman | 110—7 |
| 1,917,031 | 7/1933 | Hamilton. | |
| 3,116,143 | 12/1963 | Reichl | 110—7 X |
| 3,168,074 | 2/1965 | Kuhner et al. | 110—7 X |
| 3,215,099 | 11/1965 | Coulter | 110—7 |

JAMES W. WESTHAVER, *Primary Examiner.*

U.S. Cl. X.R.

110—28